June 3, 1941.  L. J. MOSS  2,244,209

PORTABLE POWER CANE AND JUICE MILL

Filed May 13, 1939  2 Sheets-Sheet 1

Inventor
Lenis J. Moss,

By Clarence A. O'Brien
and Hyman Berman
Attorneys

June 3, 1941.　　　　　L. J. MOSS　　　　　2,244,209
PORTABLE POWER CANE AND JUICE MILL
Filed May 13, 1939　　　　2 Sheets-Sheet 2
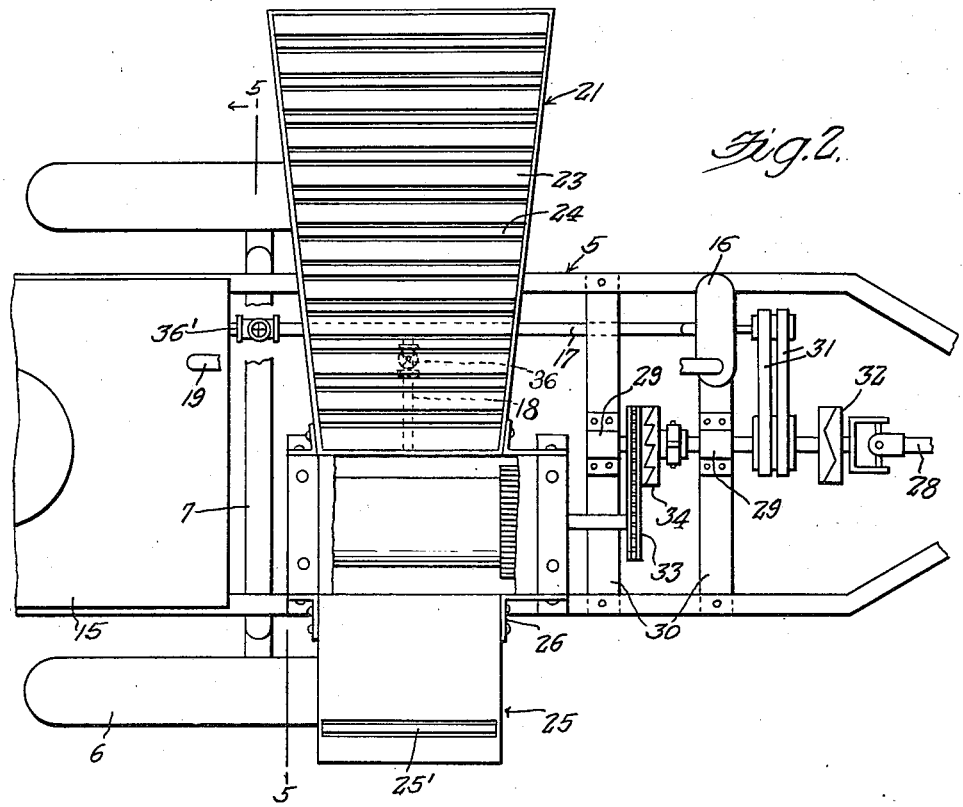
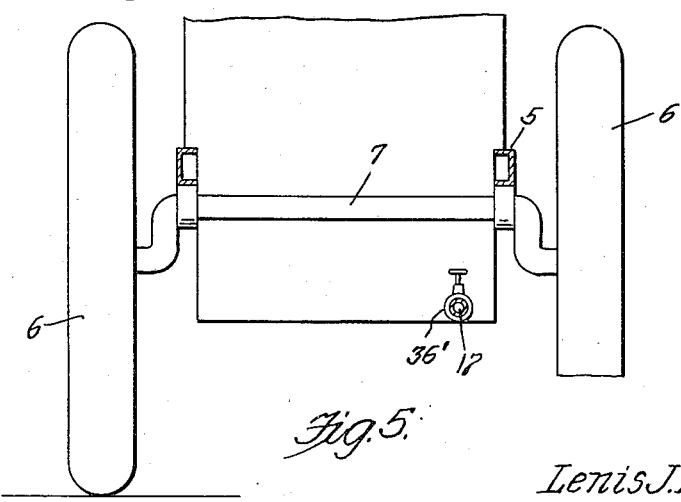
Inventor
Lenis J. Moss,
By Clarence A. O'Brien
and Hyman Berman
Attorneys Patented June 3, 1941

2,244,209

UNITED STATES PATENT OFFICE 2,244,209

PORTABLE POWER CANE AND JUICE MILL

Lenis Joseph Moss, Henry, La.

Application May 13, 1939, Serial No. 273,534

1 Claim. (Cl. 100—47)

This invention relates to what may be termed a portable power cane and juice mill, the invention consisting in the provision of a machine adapted to be connected to a tractor or other draft device for use as a trailer and equipped for extracting sugar cane juice from raw sugar cane.

Among the objects of the invention is the rendering it possible to extract sugar cane juice from sugar cane in the field and where the sugar cane has been planted.

The invention together with its objects and advantages will be best understood from a study of the following description taken in connection with the accompanying drawings wherein—

Figure 2 is a top plan view of the device.

Figure 1:
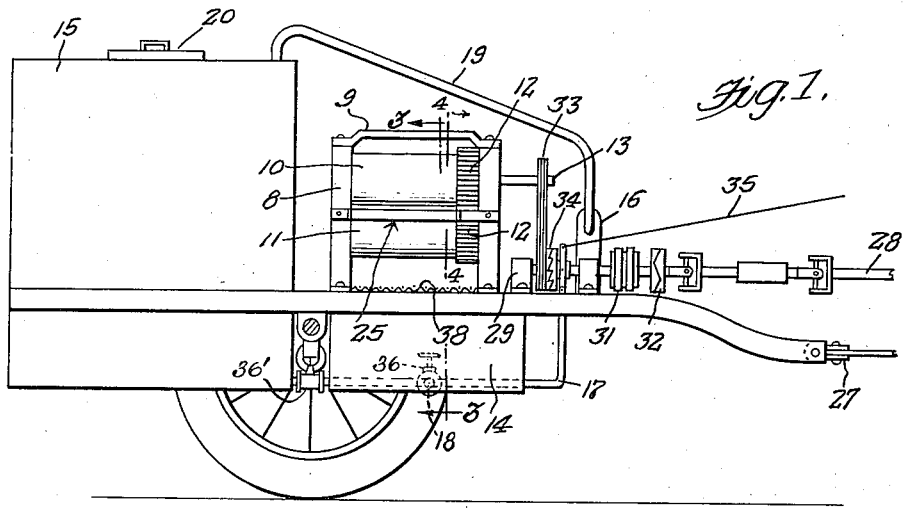
Figure 1 is a side elevational view of the juice mill or extractor with the wheel on the near side removed and the axle shown in section.
Figure 3:
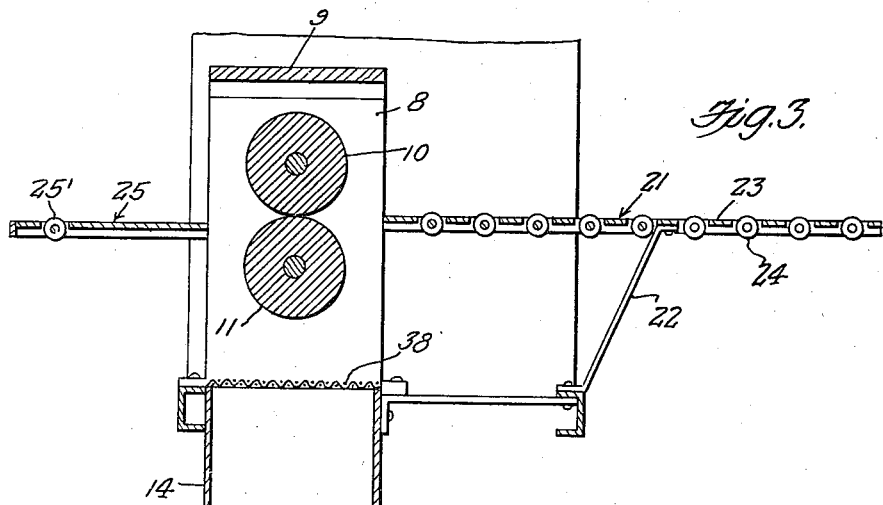
Figure 4:
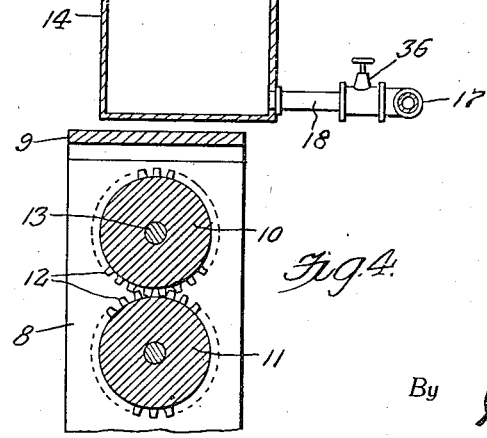

Figures 3 and 4 are sectional views taken substantially on the lines 3—3 and 4—4, respectively, of Figure 1.

Figure 5 is a transverse sectional view taken substantially on the line 5—5 of Figure 2.

Referring more in detail to the drawings it will be seen that the device is in the form of a trailer and embodies a chassis frame 5 supported by suitable wheels 6 mounted on an axle 7.

Suitably mounted on the chassis frame 5 adjacent one side thereof and forwardly of the axle 7 are a pair of opposed standards 8—8 connected at their upper ends by a top plate 9.

Journaled between the standards 8 are upper and lower crushing and extracting rollers 10 and 11 adapted to receive the sugar cane stalks therebetween for crushing said stalks and forcing the sugar cane juice from said stalks.

At one end thereof the rollers 10 and 11 are provided with intermeshing gears 12—12 and the shaft of the roller 10 has ane end thereof extended beyond a standard 8 as at 13.

To receive the juice extracted from the stalks as the sugar cane stalks pass between and are crushed by the rollers 10 and 11, there is suitably mounted on the chassis 5 beneath the rollers 10 and 11 a juice-receiving trough or tank 14.

For storing the juice accumulating in the trough or tank 14 there is also suitably mounted on the chassis frame 5 adjacent the rear end thereof a relatively large storage tank 15.

For pumping the juice from the receiving tank or trough 14 to the storage tank 15 there is suitably mounted on the chassis a pump 16 which has the inlet side thereof connected with the receiving tank or trough 14 through the medium of conduit pipes 17 and 18. The outlet side of the pump 16 is connected with the top of the storage tank 15 through the medium of a conduit pipe 19. As will be seen the pipe 17 connects with the bottom of the storage tank 15 through means of a valve 36' while the pipe 18 leads from the bottom of the tank 14 to the pipe 17 and contains a valve 36. Thus by closing the valve 36' and opening the valve 36 the pump will pump the juice from the tank 14 to the tank 15. By closing the valve 36 and opening the valve 36' and connecting the outlet of the pump 16 by the pipe 19 with a stationary storage tank the juice can be pumped from the storage tank 15 of the invention to this main storage tank. Of course, if the pipe 19 is used it must be disconnected from the tank 15 and connected to the main storage tank or another pipe may be used instead of the pipe 19 and in this latter case the pipe 19 must be disconnected from the outlet of the pipe and this other pipe substituted for it.

Also access may be had to the interior of the tank 15 through a suitable manhole provided in the top of said tank, and for said manhole there is provided a cover or lid 20 as shown.

To facilitate the feeding of the sugar cane stalks to the crushing and extracting rollers 10 and 11 there is mounted at one side of the rollers and suitably positioned relative thereto a laterally extending table 21 that is braced relative to the chassis frame through the medium of brace bars 22.

The table 21 consists of a suitable frame that gradually tapers from the outer end thereof to the end thereof approaching the rollers 10 and 11, and the sides of the frame are connected by spaced slats 23 between which are accommodated transverse rollers 24.

To receive the crushed and broken stalks as they pass from between the rollers 10 and 11 there is also mounted at the side of the rollers opposite to the table 21 a relatively short laterally extending table 25 that is substantially coplanar with the table 21 and is mounted in position through the medium of brackets 26.

The table 25, as shown, is provided adjacent the outer end thereof with a transverse slot in which is journaled a roller 25' to facilitate the movement of the crushed cane stalks thereover, it being obvious that the stalks feeding from between the rollers will cause the previously fed stalks on the table 25 to be pushed therefrom to fall in a pile on the ground at one side of the device.

The chassis frame 5 at the forward end of the device is provided with a hitch 27 through the medium of which the mill or extractor is coupled to the rear end of a tractor or other suitable draft vehicle.

Also, in accordance with the present invention, it is intended to have the device coupled to a tractor or the like provided with a power take-off shaft a portion of which is shown in the drawings and indicated by the reference numeral 28. For supporting an end of the shaft 28 on the chassis 5 there are provided for said shaft bearings 29, these bearings being mounted on suitable cross-bars 30 as clearly shown in Figure 2.

Drive from the power take-off shaft 28 is transmitted to the shaft of the pump 16 through the medium of belt and pulley drive means 31 as best shown in Figure 2.

Interposed in the shaft 28 at one side of the belt and pulley drive means 31 is a slip clutch 32 so as to prevent injury either to the power take-off shaft 28 or the shaft of the pump 16 as might otherwise result in the event something defective developed either with respect to the shaft 28 or the pump 16 and its shaft.

Also drive from the power take-off shaft 28 is transmitted to the uppermost roller 10 through the medium of a chain and sprocket drive connection 33. The chain and sprocket drive connection 33 is connected with the power take-off shaft 28 through the medium of a suitable clutch 34 and for controlling the clutch 34 from his position on the tractor or other draft device by the operator of the latter there is provided an operating chain or the like 35 that at one end is suitably connected with the shiftable element of the clutch 34 and extends forwardly to terminate on the tractor at a position convenient to the operator thereof.

Obviously, drive from the roller 10 is transmitted to the roller 11 through the medium of the gearing 12—12. It will also be seen that by properly manipulating the clutch 34 drive from the shaft 28 to the rollers may be interrupted or resumed at the will of the operator.

In use the device is drawn over the field behind a tractor or other suitable draft device and the cane stalks are placed on the table 21 to be fed to the rollers 10 and 11. Passing between the rollers 10 and 11 the stalks are crushed and the juice forced therefrom to drop into the tank 14, the crushed stalks passing from between the rollers onto the table 25 to ultimately be deposited on the ground at one side of the tractor. From the tank 14 the juice is pumped to the tank 15 for storage purposes. Thus it will be seen that the extracting of the juice from the cane stalks can be readily and easily accomplished at the place where the stalks grow.

Also, and as clearly shown, there is disposed over the open top of the tank 14 a filtering screen or the like 38 through which the juice filters into the tank 14. The screen 38 also serves to prevent any dust or other foreign matter gaining access to the tank 14. By having the frame of the device supported by a single pair of wheels the device can be readily turned at each end of a cane row and the table 21 should be at such a height that a man can easily place the stalks of cane thereon and the tank 14 should be high enough from the ground so as to not strike and thus injure the stubble cane which is allowed to grow the next season, thereby saving the expense of replanting. The capacity of the tank 15 should be such as to permit the device to make one round in a cane field so that the tank 15 can be emptied into a main storage tank at the starting point.

It is thought that a clear understanding of the construction, utility and advantages of an invention of this character will be had without a more detailed description.

Having thus described the invention what is claimed as new is:

Means for extracting juice from cane in the field in which the cane is grown comprising a frame, a pair of wheels supporting the frame, upper and lower crushing rollers rotatably supported in the frame and extending longitudinally of the frame, a table for feeding cane to the rollers extending transversely of the frame and projecting from one side thereof, said table having its bottom formed of transversely extending slats with rollers between the slats, a second transversely arranged table for receiving the crushed stalks from the crushing rollers, said second table being transversely arranged and projecting from the opposite side of the frame and provided with a transverse slot adjacent its outer end, a roller journaled in the slot, a receiving tank located below the lower crushing roller for receiving the juice dropping therefrom, a screen covering the top of the tank, a storage tank on the frame, a pump, a pipe leading from the inlet of the pump to the receiving tank, a pipe leading from the outlet of the pump to the top of the storage tank and means for rotating the crushing rollers and actuating the pump.

LENIS JOSEPH MOSS.